Sept. 21, 1943.  H. HORNSCHUCH  2,329,990
SEALING DEVICE
Filed Feb. 12, 1942
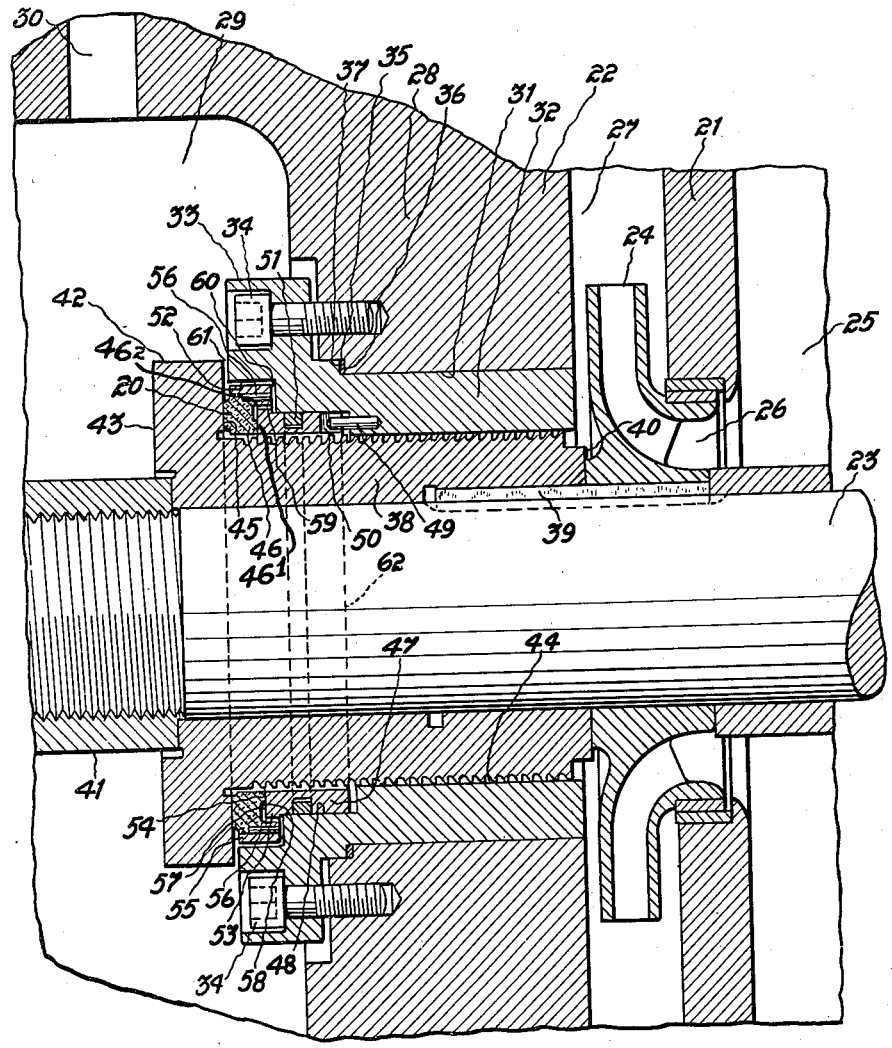
INVENTOR
Hanns Hornschuch
BY
HIS ATTORNEY.

Patented Sept. 21, 1943

2,329,990

UNITED STATES PATENT OFFICE 2,329,990

SEALING DEVICE

Hanns Hornschuch, Easton, Pa., assignor to Ingersoll-Rand Company, New York, N. Y., a corporation of New Jersey Application February 12, 1942, Serial No. 430,591

1 Claim. (Cl. 286—9)

This invention relates to sealing devices, and more particularly to a sealing device for a centrifugal pump and the like.

The invention is intended more particularly for use in connection with sealing devices of the type known as mechanical seals comprising a pair of sealing components which cooperate to effect a seal and operate in such wise as to valve a limited quantity of liquid therebetween in order to minimize wear on their sealing surfaces.

As is customary in devices of this nature one component is carried by a rotary member, as for example a shaft of a centrifugal pump and, therefore, rotates with the shaft but is incapable of longitudinal movement other than such slight endwise movement as may occur by reason of the natural clearances between the rotor of the pump and the elements serving as abutments therefor.

The other sealing component is restrained against rotary movement but is capable of moving longitudinally with respect to the rotor and, therefore, with respect to the sealing component carried by the rotor.

It is an object of the present invention to avoid undue wear of the surfaces serving the sealing function. More specifically, it is an object to avoid the application of excessive pressure to the surfaces of the non-rotary sealing component and thereby obviate the changes of damaging the sealing surfaces.

Another object is to simplify the construction of the sealing device so that it may be readily serviced and maintained with a minimum of expense.

Other objects will be in part obvious and in part pointed out hereinafter.

The figure in the accompanying drawing is a longitudinal elevation, partly in section, of a sealing device constructed in accordance with the practice of the invention and a portion of a centrifugal pump to which it is applied.

Referring more particularly to the drawing, 20 designates, in general, the sealing device constructed in accordance with the practice of the invention and 21 a pump embodying the sealing device.

The pump comprises a casing 22 having a shaft 23 extending horizontally therethrough and an impeller 24 mounted upon the shaft. The impeller 24 may be the final stage impeller of a multi-stage pump and the fluid handled by it passes through an inlet chamber 25 to the eye 26 of the impeller and is discharged into a pumping chamber 27 containing the impeller.

In the arrangement shown the wall 28 constituting the outer bounding surface of the pumping chamber 27 also forms a bounding surface for a low pressure or balancing chamber 29 having an outlet passage 30 that may communicate, in a well known manner, with the inlet chamber (not shown) of the pump.

The shaft 23 extends through the wall 28 which has a bore 31 of considerably larger diameter than the shaft for the accommodation of a sleeve 32 having an external flange 33 at its outer end through which extend bolts 34 for securing the sleeve fixedly to the wall 28. A gasket 35 is interposed between an external shoulder 36 on the sleeve 32 and a shoulder 37 in the bore 31 to prevent the leakage of liquid along the outer surface of the sleeve.

Arranged on the portion of the shaft 23 lying within the sleeve 32 is a balancing drum 38 that is held against rotary movement with respect to the shaft by the key 39 which secures the impeller 24 to the shaft. The inner end of the balancing drum seats against the hub of the impeller 24 and the portion of said end of the balancing drum lying exteriorly of the hub of the impeller constitutes a pressure surface 40 that is constantly subjected to the pressure of the liquid in the pumping chamber 27.

The balancing drum 38 is held against the impeller by a nut 41 threaded upon the shaft 23 and seating against the outer end of the balancing drum. This end of the balancing drum carries an external flange 42 that overlies the sleeve 32, and the outer end surface of the balancing drum constitutes a pressure surface 43 that is subjected to the pressure of the liquid within the balancing chamber 29. The peripheral surface of the balancing drum 38 is grooved to form a labyrinth 44 that preferably extends from the inner end of the balancing drum to a point near the flange 42.

In the form of the invention illustrated the inner surface of the flange 42 constitutes a sealing surface 45 that cooperates with a sealing member 46 for controlling the flow of liquid from the pumping chamber 27 through the sleeve 32 to the balancing chamber 29. The sealing member 46 is of ring-shape constructed of carbon and arranged directly about the balancing drum in spaced relation therewith so that both the inner and the end surfaces of the sealing member will be subjected to the liquid flowing along the surface of the balancing drum.

In view of the fragile nature of the material of which the sealing member 46 is constructed it is desirable that the said member be suitably supported on its peripheral surface. To this end the sealing member is arranged in a holder 47 lying in a recess 48 in the sleeve 32. The holder 47 is in the form of a ring that is slidable endwise within the recess 48 so that it may be freely responsive to the forces acting thereagainst for maintaining the sealing member 46 in the correct sealing relationship with the sealing surface 45. A pin 49 seated in the sleeve 32 extends into a notch 50 in the inner end of the holder to prevent rotation of said holder with respect to the sleeve 32.

The bore of the holder 47 is of sufficiently larger diameter than the balancing drum to avoid contact between the two, and in the periphery of the holder is a sealing ring 51 to prevent the passage of liquid along the outer surface of the holder.

The recess 48 is provided at its outer end with an enlarged portion 52 to accommodate an external flange 53 of the holder 47 which has an annular internal recess 54 that opens into the bore of the holder to receive the sealing member 46. The flange 53 is thereby provided with a cylindrical skirt 55 that overlies and engages the periphery of the sealing member 46 so that the force of the liquid within the sealing member will be ineffective to fracture it. The sealing member 46 is of such diameter that it will slide readily into the recess 54 but is held against rotation with respect to the holder by a pin or pins 56 seated in the flange 53 and extending into the sealing member.

As will be readily apparent from the foregoing description of the sealing device, the recess 54 is in direct communication with the liquid flowing along the periphery of the balancing drum 38 and liquid may, therefore, find its way between the rearward end surface of the sealing member and the bottom 57 of the recess which serves as a seat for the sealing member. In order, therefore, to prevent the sealing member 46 from being moved outwardly in the recess by the force of such liquid and to prevent liquid under pressure from finding its way between the periphery of the sealing member and the skirt 55 the rearward end of the sealing member is provided with an annular groove 58, and in the flange 53 are ports 59 to communicate the annular groove 58 with the clearance space 60 existing between the flange 53 and the bottom of the recess 54 and also encircling the cylindrical skirt 55. The space 60 is in communication with the balancing chamber 29 through a gap 61 defined by the inner surface of the flange 42 and the adjacent portion of the sleeve 32.

The annular groove is preferably located midway between the inner and outer surfaces of the sealing member and the portion of the end surface of the sealing member lying inside the groove constitutes a sealing surface 46' that engages the bottom of the recess 54 to prevent the excessive leakage of liquid into the annular groove 58. The portion of the end surface of the sealing member lying outside of the annular groove 58 also constitutes a sealing surface 46² and cooperates with the bottom of the recess 54 to prevent the flow of liquid from the annular groove to the periphery of the sealing member.

In order that the holder 47 may be subjected to a force that will predominate slightly over the pressure gradient existing between the sealing surface 45 and the sealing member 46 the inner end of the holder is suitably proportioned to serve as a pressure surface 62, the recess 48 being of suitable depth so that the liquid may enter freely from the labyrinth into the inner end of the recess 48 against the pressure surface 62.

From the foregoing description it will be readily apparent that liquid flowing from the pumping chamber 27 through the sleeve 32 will act against the pressure surface 62 to maintain the flange 53 against the inner end of the sealing member and to hold the sealing member in the correct relationship with the surface 45. In these positions of the sealing elements only a sufficient amount of leakage takes place between the sealing surface 45 and the sealing member 46 to protect them against undue wear, it being understood that the surface 62 and the sealing surface of the member 46 are suitably proportioned to assure this effect.

Being slidable within the recess 48 the holder 47 and the sealing member, may of course, reciprocate with the rotating parts in such limited degree as may be permitted by the elements serving as abutments for the rotating parts but the sealing member will at all times be held in the correct sealing relationship with the sealing surface 45 by the pressure of the liquid acting against the pressure surface 62.

During this operation of the device, some liquid will enter between the bottom 57 of the recess 54 and the adjacent surface of the sealing member. However, upon reaching the groove 58 such liquid will pass through the ports 59 and the spaces 60 and 61 into the balancing chamber 29 instead of acting to separate the holder 47 and the sealing member 46 and possibly thrusting the latter with undue force against the sealing surface 45.

In practice, the present invention has been found to be highly effective as a sealing device for use in connection with the relatively stationary and rotary elements of a centrifugal pump. It requires only a few parts of simplified design and the sealing member may be quickly replaced without necessitating prolonged idle periods of the pump. The sealing member is, moreover, of simplified design so that its renewal will involve only a minimum of expense.

I claim:

A sealing device, comprising a casing having a bore subjected to fluid under pressure and a low pressure zone, a rotary member in the bore having a sealing surface, an annular sealing member encircling the rotary member to seat at one end against the sealing surface to valve a restricted flow of fluid medium from the bore outwardly along the sealing surface and having an annular groove in the other end to receive fluid medium flowing outwardly from the bore along said other end of the sealing member, a holder slidable endwise in the casing having an annular recess in communication with the bore to receive the sealing member, a flange on the holder to engage the peripheral surface of the sealing member, a seating surface in the recess for said other end of the sealing member, sealing surfaces on the opposite sides of the annular groove to engage the seating surface, there being a passage through the holder communicating the groove with the low pressure zone to provide an outlet for fluid medium flowing outwardly from the bore into the annular groove, and a pressure surface on the holder subjected to the fluid medium in the bore to urge the holder and the sealing member toward the sealing surface.

HANNS HORNSCHUCH.